Oct. 25, 1955   R. E. RISLEY ET AL   2,721,581
PIPE REPAIR SLEEVE

Filed Oct. 19, 1951   6 Sheets-Sheet 1

INVENTORS
ROGER E. RISLEY AND
HOWARD L. HOKE
BY
Robert E. Burns
ATTORNEY

Oct. 25, 1955

R. E. RISLEY ET AL

2,721,581

PIPE REPAIR SLEEVE

Filed Oct. 19, 1951

INVENTORS
ROGER E. RISLEY AND
BY HOWARD L. HOKE

Robert E Burns
ATTORNEY

United States Patent Office 2,721,581
Patented Oct. 25, 1955

2,721,581

PIPE REPAIR SLEEVE

Roger E. Risley and Howard L. Hoke, Bradford, Pa., assignors to Dresser Industries, Inc., Dallas, Tex., a corporation of Pennsylvania Application October 19, 1951, Serial No. 252,152

12 Claims. (Cl. 138—97)

This invention relates to repair sleeves for pipe lines and is more particularly concerned with a split repair sleeve adapted to be welded into position upon the pipe line to seal off a damaged portion thereof.

Steel and iron pipe lines used for the transmission of oil, gas, water and like fluids, both above and below ground, ossasionally develop leaks at the joints between adjacent sections of pipe or breaks or cracks occur in the body of the pipe sections themselves. Whenever possible, these leaks, breaks, and cracks are repaired without taking the pipe line apart since costly interruptions in service are thus avoided. For this purpose there has been developed the so-called split repair sleeve which is adapted to be clamped around the portion of the pipe line to be repaired to provide a flexible but fluid-tight seal around the faulty section of the line. Split repair sleeves for this purpose are generally made from cast or wrought metal and commonly comprise two semi-cylindrical segments provided with longitudinal flanges which are adapted to receive side clamping bolts for drawing the two segments together upon suitable packing material, extending longitudinally of the segments. The ends of the segments are brought into fluid-tight engagement with the outer surface of the pipe to seal off the interior of the repair sleeve by means of suitable gaskets which are compressed radially inwardly against the pipe surface by means of suitable clamping rings or followers.

It is considered adavntageous in some cases to connect the segments of the sleeve to one another and to the pipe by welding. Welding, however, presents many practical problems, primarily from the standpoint of safety and satisfactory installation. For example, particularly in the case of high pressure lines such as pipe lines carrying high pressure gas and volatile liquids such as gasoline and crude oil, the gas or liquid under pressure in the pipe line tends to force the sleeve sections apart, and it is difficult to maintain the seleve segments to permit a satisfactory weld to be made. Further, once the weld has been made, it is difficult to test it to be sure that a fluid-tight closure has been obtained. Welding operations which can not be tested for fluid-tightness and thus permit any leaks to be promptly sealed are not satisfactory for commercial use in high pressure systems. To our knowledge a satisfactory split repair sleeve adapted to be installed by welding has not heretofore been provided.

It is the principal object of our invention to provide an improved split repair sleeve for pipe lines.

It is another object of our invention to provide a split repair sleeve wherein the sleeve sections are adapted to be sealed by welding to each other and to the pipe section upon which the sleeve is installed.

It is another object of the invention to provide a split repair sleeve of the character indicated wherein means are provided by automatically testing the fluid-tightness of the weld at the time of installation.

It is another object of the invention to provide a split repair sleeve construction including clamping means for holding the sections of the sleeve together during installation to permit satisfactory welding of the sleeve to be effected.

It is a further object of the invention to provide a split repair sleeve which may be installed upon a pipe line by welding while the line remains in service.

According to the invention, we provide a two segment split repair sleeve which is provided with flexible fluid-tight sealing means and in which the longitudinal edges of the sleeve segments are adapted to be jointed by welding. The repair sleeve of our invention is adapted to adapted to receive a clamp member for effectively holding the sleeve segments together against the pressure inside the damaged pipe line to permit an effective weld to be made and the longitudinal edges of the sleeve sections are formed with complementary flanges which permit the weld to be made at a safe distance from the longitudinal sealing gasket between the sleeve sections. In the preferred embodiment of our invention, we provide a valve means in one sleeve section for admitting controlled quantities of the fluid in the pipe line into the space between the sleeve segment flanges for testing the fluid-tightness of the weld joint.

Other objects and features of our invention will be apparent from the following detailed description thereof and from the drawings wherein.

Figures 1, 4:
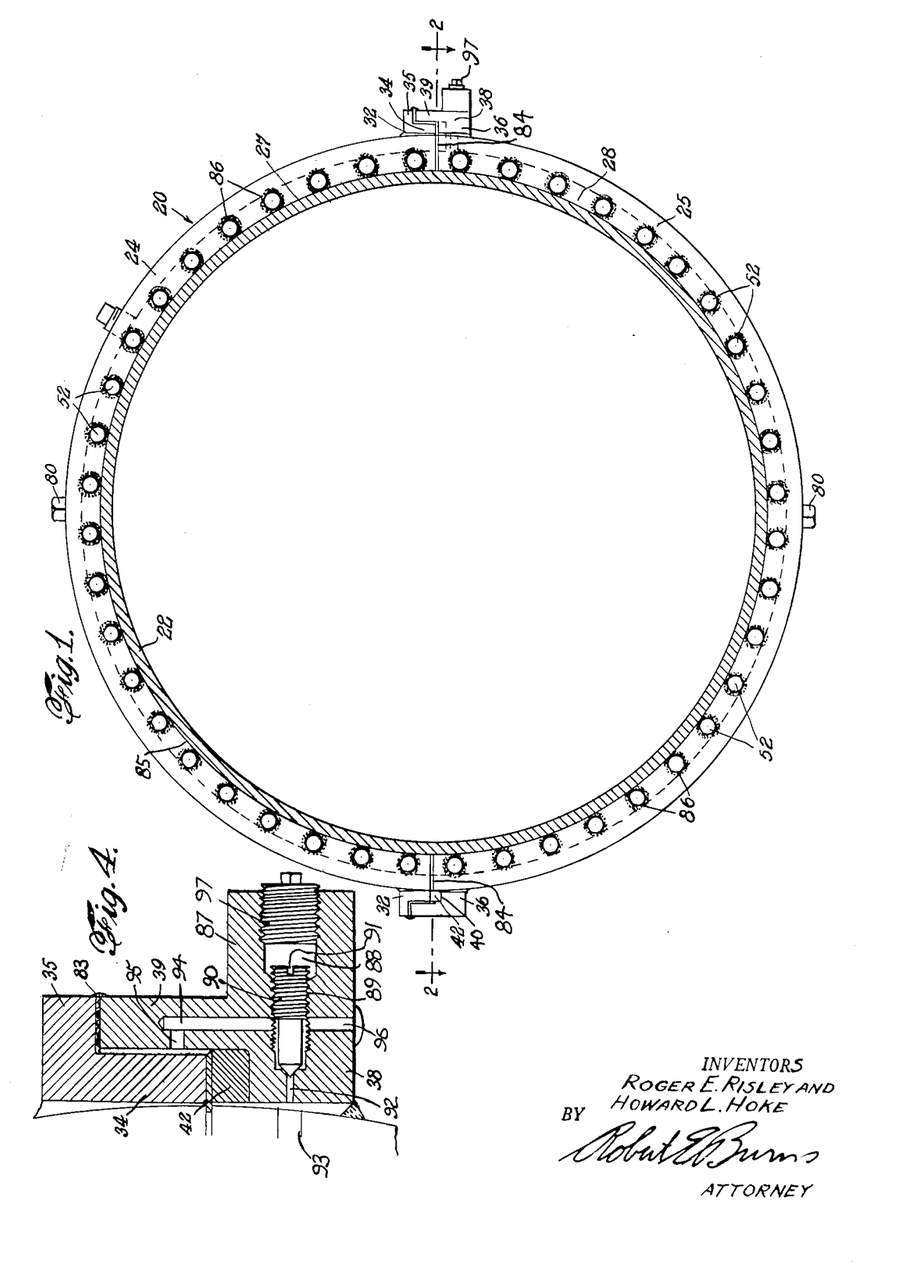
Fig. 1 is an end elevation of a split pipe repair sleeve embodying features of the present invention.
Fig. 4 is an enlarged fragmentary sectional view of the sleeve of Fig. 1 showing details of the construction of the weld-testing valve.

Referring to the drawings, and particularly to Fig. 1, the numeral 20 designates generally one illustrative embodiment of the split repair sleeve of the invention mounted in position on a pipe 22. Sleeve 20 is formed by an upper arcuate half-section or segment 24 and a complementary lower half-section or segment 25. Segment 24 is formed with an arcuate body portion and inwardly-directed arcuate end walls 27 integral with the body portion, and sleeve segment 25 is similarly formed with inwardly-directed arcuate end walls 28. As will be apparent by reference to Fig. 1, the end walls of the sleeve segments 24 and 25 define, when the sleeve is installed upon a pipe section, substantially circular apertures enclosing the pipe section to which the sleeve is applied. As may be seen in Figs. 2 and 3, the inner surfaces of the end walls 27 and 28 define gasket recesses 30 and 31, respectively, which are adapted to receive suitable packing or gasket elements for effecting fluid-tight engagement with the outer surface of the pipe 22, as will be described more in detail hereinbelow.

As previously mentioned, it is an important feature of our split repair sleeve that it may be welded into position upon a pipe section effectively and safely. For this purpose, the opposed longitudinal edges of the sleeve segments 24 and 25 are complementary in form and interengage to provide a longitudinal joint particularly adapted to be welded. Thus, referring to Fig. 1, the longitudinal edges of the sleeve segment 24 are provided with L-shaped side flanges or "side bars" 32 secured, as by welding, to the body portion of the sleeve segment. The side bars 32 have an axial portion 34 and an outwardly-extending radial portion 35. The longitudinal edges of the segment 25 are provided with complementary L-shaped side bars 36. The side bars 36 are formed with a body portion 38 and an upwardly-extending flange portion 39 which, when the two segments are assembled to form the sleeve, overlies the axial portion 34 of segment 24.

Figure 2:
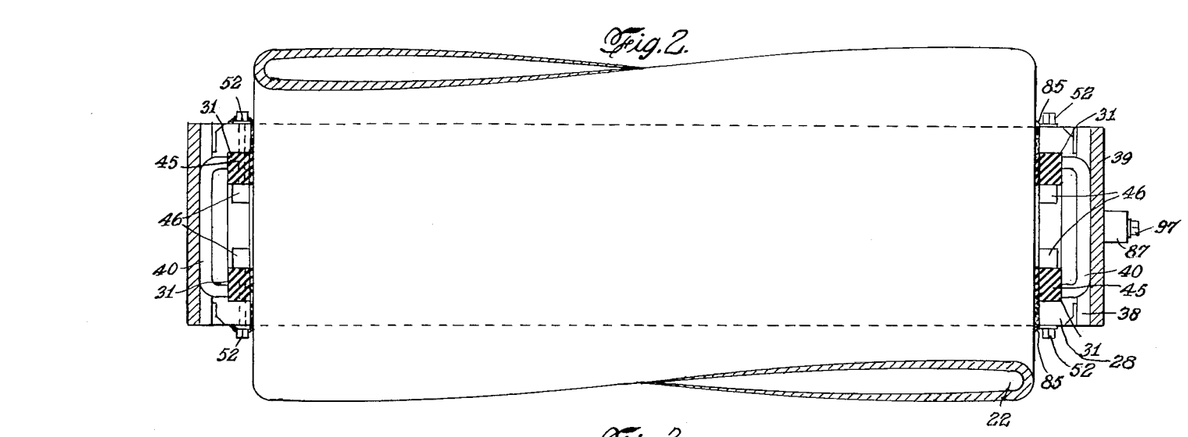
Fig. 2 is a side elevation, partly in section, taken approximately along the line 2—2 of Fig. 1 showing the structure of the longitudinal edge of the lower sleeve segment.

Although the longitudinal joints between the sleeve segments are ultimately sealed and permanently joined by welding, we also advantageously provide a flexible resilient seal between the segments. For this purpose the faces of the body portions 38 of side bars 36 are formed with a side pack recess or groove 40. The grooves 40 extend longitudinally in the central portion of the side bars 36 and their ends curve inwardly and extend through the end faces of the sleeve segment 25 itself so that they terminate at and communicate with the respective gaskets recesses 30 and 31. The structure is shown in Fig. 2. The grooves 40 may be of any convenient form longitudinally and they will naturally conform to the width of the sleeve segment 25. The grooves are preferably of substantially uniform width throughout their length, and throughout their depth, and are preferably of rectangular cross-section, although this is not essential.

Each of the grooves 40 receives a longitudinal side packing 42 of a width substantially equal to that of the grooves 40 and of a thickness somewhat greater than the depth of the grooves so that when the packing 42 is inserted in the grooves a substantial portion of it will extend upwardly above the face of the body portion of side bar 36. Thus, when the two sleeve segments 24 and 25 are drawn together, the packing 42 is compressed and is displaced laterally. A fluid-tight seal is likewise provided at the end of the sleeve 20 by means of the previously-mentioned packing or gasket elements 45 which are adapted to be compressed in gasket recesses 30 and 31 and to be displaced radially inwardly into sealing relationship with the outer surface of pipe 22 and side packings 42. Thus, the ends of side packings 42 merge with the gaskets 45 to form a continuous seal. While gaskets 45 may be of any convenient form, they are suitably cut from a straight strip of material or molded to a semi-circular form with the meeting ends formed to effect a butt joint, each being seated in the gasket recesses 30 and 31.

The gaskets 45 and the packings strips 42 are formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined.

Figure 3:
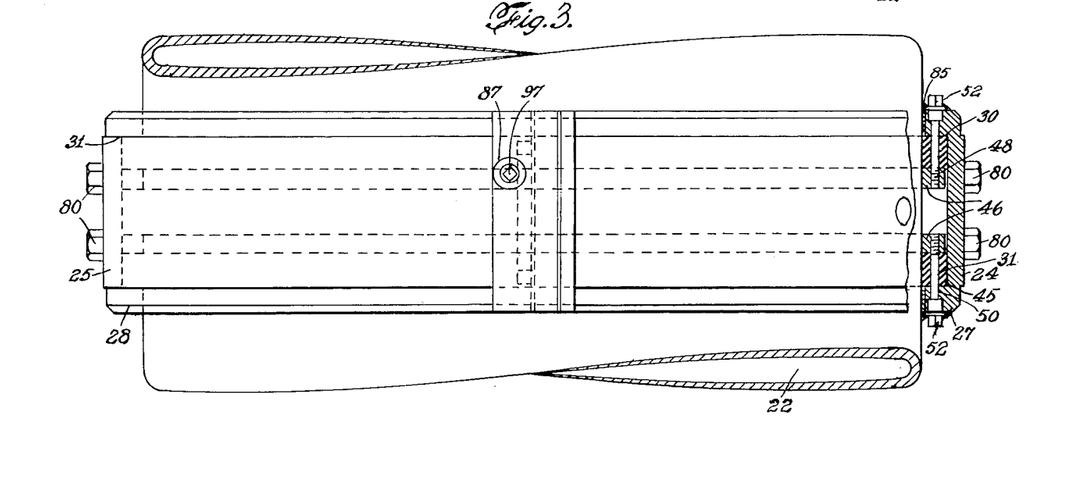
Fig. 3 is a side elevation, partly in section to show details of construction, of the split repair sleeve shown in Fig. 1.

Gaskets 45 are compressed into sealing relationship with pipe 22 by means of clamping rings or followers 46. The followers 46 are disposed interiorly of the sleeve segments and are provided with a series of threaded apertures 48 which are adapted to register with bolt holes 50 in the end walls 27 and 28 and with corresponding holes formed in the gaskets 45. The followers 46 are drawn toward end walls 27 and 28 to compress the gaskets 45 by means of bolts 52 which are threadedly received in the end walls and followers, as shown in Fig. 3. The followers 46 are advantageously formed from two substantially semi-circular members having complementary abutting ends or formed with overlapping ends, the overlapping portions being of reduced thickness so that the followers will be of substantially uniform thickness throughout their circumference.

Figure 5:
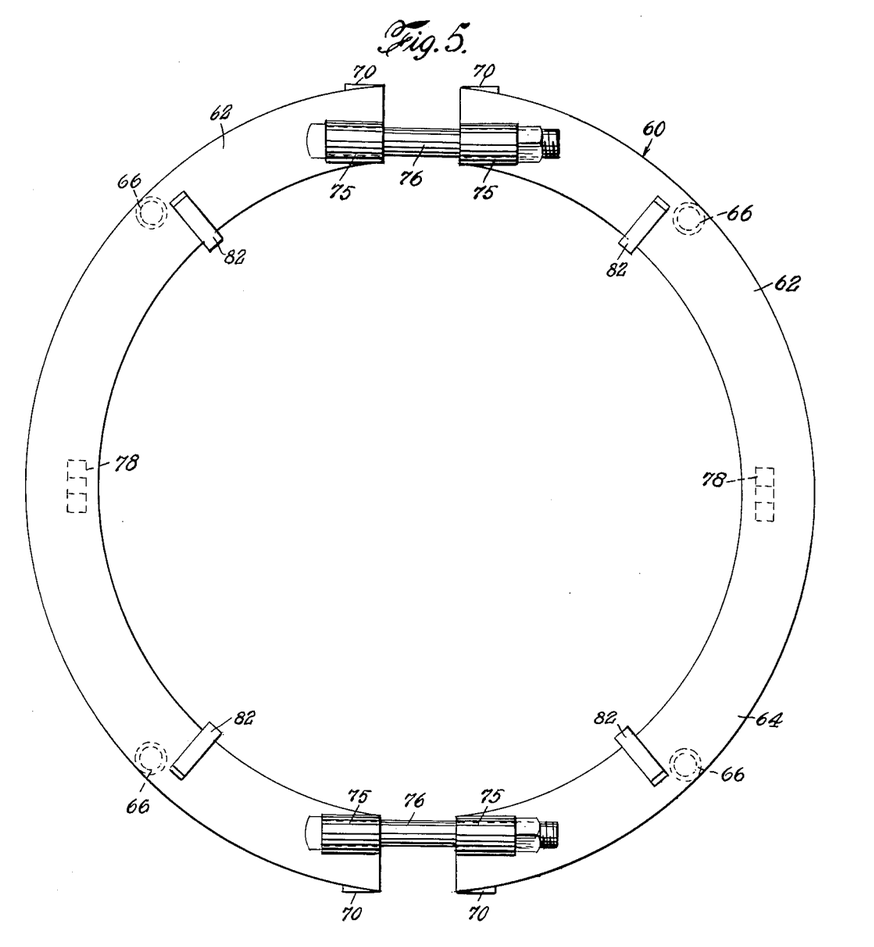
Fig. 5 is an end elevation of the clamp means which cooperates with the repair sleeve shown in Fig. 1 to hold it in position during welding.
Figure 6:
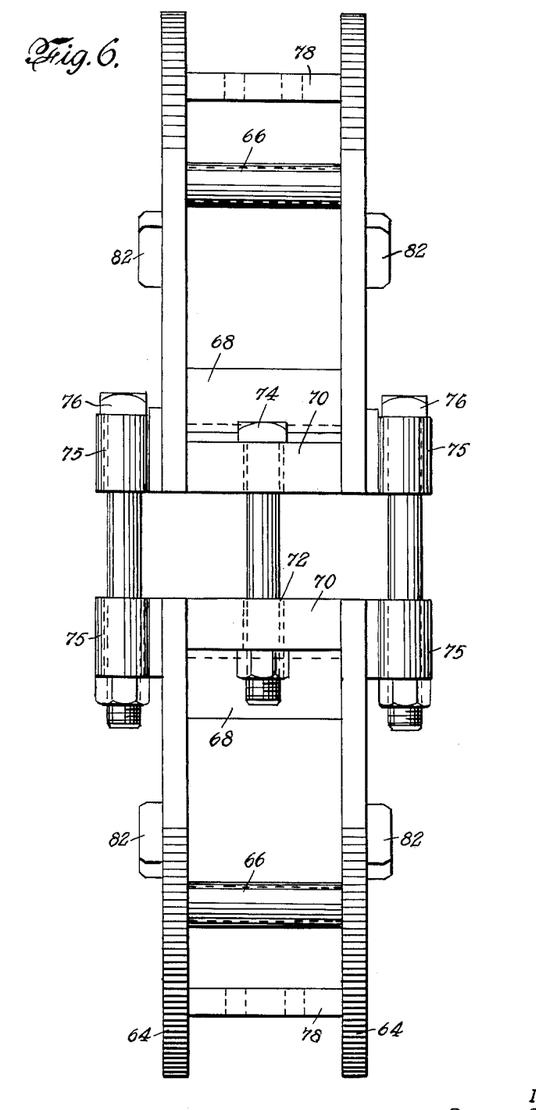
Fig. 6 is a side elevation of the clamp means shown in Fig. 5.

When our split repair sleeve is installed the two sleeve segments are welded together while the side packing members or strips 42 are under compression, i. e. in sealing relationship between the opposed faces of the segments. In order to hold the segments in this position during the welding operation, we provide an easily-assembled clamping arrangement. Referring particularly to Fig. 5 and Fig. 6, the clamp, designated generally by the reference numeral 60, comprises two arcuate sections 62 each formed from a pair of parallel arcuate strips 64 which are maintained in fixed spaced relationship by reinforcing bars 66 and braces 68. The ends of the sections 62 are provided with side bars 70 secured, as by welding, between strips 64. The side bars 70 are provided with aligned apertures 72 for receiving bolts 74, as shown in Fig. 6. The sections 62 are also provided at each end with two bolt receptacles 75 having aligned apertures through which are passed bolts 76. The clamp sections 62 may thus be drawn together to the desired degree by means of the bolts 74 and 76. In practice, each of the clamp sections 62 is mounted on one of the sleeve segments 24 and 25 and the segments are then drawn together to compress the side pack strips 42 by means of the bolts 74 and 76. Thus, the clamp sections 62 are provided with an apertured bolt plate 78 extending between strips 64 approximately centrally thereof, the apertures in the plate 78 coinciding, when the clamp sections are assembled, with bolt sockets which are advantageously in the form of nuts 80, welded or otherwise secured to the sleeve segments 24 and 25. Clamp sections 62 are secured in place by means of bolts 81 extending through the apertures in bolt plates 78 into nuts 80. The clamp sections 62 are also advantageously provided with guide or spacer bars 82 to facilitate installation, although the bars 82 may be omitted.

Figure 7:
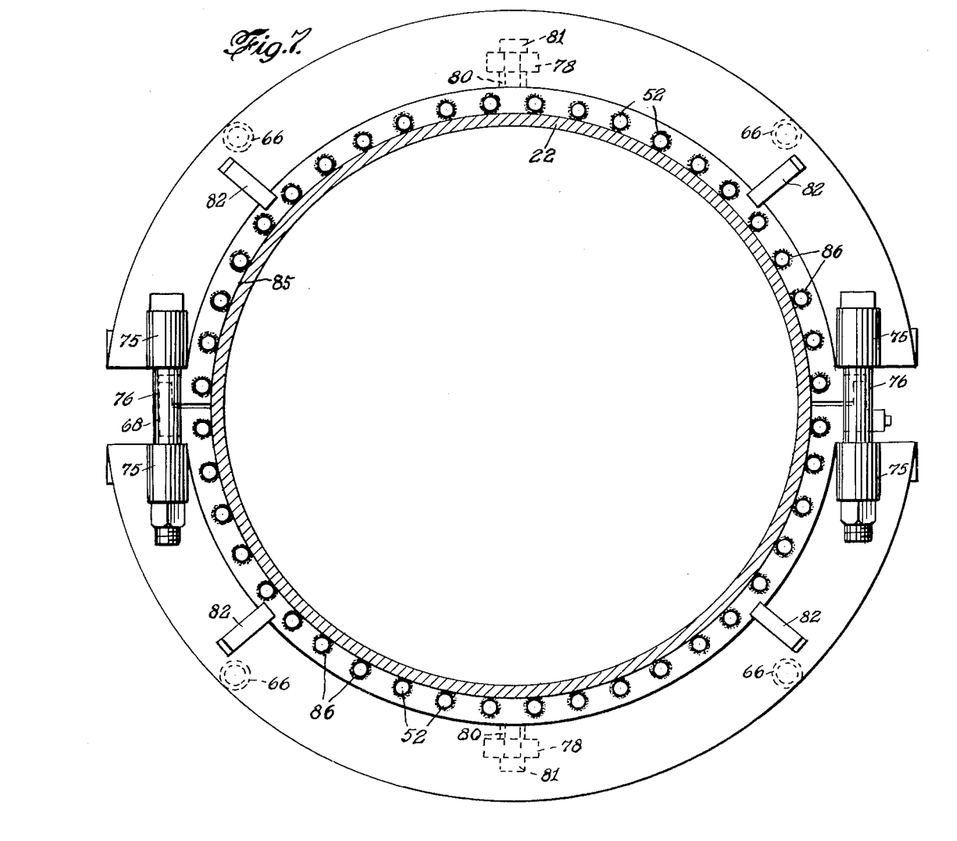
Fig. 7 is an end elevation of the split repair sleeve of Fig. 1 with the clamp means shown in Fig. 5 temporarily installed upon it.

To assemble the split repair sleeve 20 over a leaky joint or a cracked or damaged section of a pipe, the two segments 24 and 25, with the gaskets 45 and the followers 46 loosely secured to end walls 27 and 28 by means of bolts 52, are positioned around the pipe. With the two clamp sections 62 secured in position on the sleeve segments by means of bolts 81, the sections 62, and thus the segments 24 and 25, are drawn together by bolts 74 and 76 to compress side packing strips 42 into sealing relationship between the segments. This is the position shown in Fig. 7. The bolts 52 are then tightened to draw followers 46 toward end walls 27 and 28 to compress gaskets 45 in gasket recesses 30 and 31 and thereby cause the gaskets to expand radially inward into sealing engagement with the outer surface of pipe 22 and with the ends of side packing strips 42. The sleeve 20 is now ready to be welded. Advantageously, loose asbestos 79 is packed in the gap between the side bars and in the annular space between the pipe and the sleeve end walls to prevent welding sparks from coming into contact with the gaskets 45 and the side packing strips 42. Welds are then made along the longitudinal clearance between opposed side bar portions 35 and 36, as indicated in Fig. 1 at 83, along the end clearances indicated at 84, along the annular aperture at the ends of the sleeve, as indicated at 85, and around the bolt heads of the sleeve, as indicated at 86. After the welds have been made, the clamp is removed by loosening bolts 74, 76 and 81 and the sleeve 20 remains permanently in place, providing an effective, fluid-tight enclosure for the damaged portion of the pipe line. There is thus no need to replace any portion of the line and service through the line is in no way interrupted during installation of the repair sleeve.

In our installed sleeve, after the sleeve has been completely welded two seals are obtained. One seal is provided by the cooperating action between the end gaskets 45 and side packing members 42. The second seal is provided by the welds which connect the sleeve segments to the pipe upon which the sleeve is mounted. If the pressure in the line should become sufficiently great to force the fluid past the gasket-side pack seals, the weld seals will prevent escape of fluid from the line. It is therefore of importance for the installer to be sure that the welds are fluid-tight.

As previously mentioned, it is one of the features of our improved repair sleeve that the welds may be tested so that the installer may know with certainty that the desired weld has been made before the clamp is removed. For this purpose there is provided valve means in one of the side bars of sleeeve segment 25. Referring to Fig. 1 and Fig. 4, the body portion 38 of the right hand side bar 36 is formed with a radial extension 87 which has a bore 88 which is internally threaded along a portion of its depth. The bore 88 has a threaded continuation 89 in body portion 38 in which is threadedly received a valve member 90 having a slot 91 in its head for receiving a turning tool. The inner end of the valve member 90 is conical in form and is adapted to be seated in the end of a small diameter bore 92 communicating directly with an aperture 93 extending through the wall of sleeve segment 25. Also, communicating with the threaded bore continuation 89 is a vertical passageway 94 extending into side bar flange 39 and having an inwardly directed portion 95 communicating with the space between the side bars inwardly of the weld 83 and outwardly of the side pack 42. The passageway 96 is made during the drilling of passageway 94 and is merely sealed off at its outer end after the drilling has been completed. The valve member 90 is normally in the closed position shown in Fig. 4 with its conical inner end seated in the bore 92 and the outer end of bore 88 closed by a plug 97. When, however, after the welding operation has been completed, it is desired to test the fluid-tightness of the welds, the plug 97 is removed and the valve member 90 is turned, as by a screw-driver or like tool, to unseat the conical end of the valve. This permits the fluid, e. g. gas or gasoline, in the damaged pipe portion enclosed within the sleeve, to enter the bore continuation 89 through aperture 93 and bore 92 and then to pass through passageway 94, 95 into the space between the side bars, interiorly of the weld 83. The pressure in this space is thus the same as that inside the pipe line and any escape of fluid through an imperfect portion of the welds is easily detected and repaired. The valve member 90 is of course closed when welding is resumed following the test. As will be apparent by reference to Figs. 1–3, when the welds 83, 84 and 85 have been made, the space between the side bars on one side of the sleeve 20 is in fluid-conductive connection with the corresponding space on the opposite side of the sleeve through the channels defined by the welds 85, the gaskets 45, the side walls 27, 28, and the surface of the pipe 22. Thus, the single valve means described is sufficient to permit the testing of all of the welds.

It will be observed that the construction of the side bars defining the longitudinal juncture between the sleeve segments 24 and 25 is such that the point of welding is well removed from the side packing 42. Thus, any danger of damaging the packing by the heat of the welding operation is avoided. Similarly, the position of welds 84 is also well removed from the packing. The thickness of end walls 27 and 28 prevents too close contact between the welds 85 and the gaskets 45. Our sleeve 20 is thus adapted to be welded safely and effectively and to be tested for fluid-tightness at the time of installation. In the case of an oil line leak, the ground around the leak becomes saturated with oil and there is serious danger of fire if welding is carried out immediately upon installation of the sleeve. However, in using our sleeve with its removable clamp arrangement, welding may be deferred until the ground has dried out to a sufficient extent that the fire hazard is avoided. Further, in practice, it is sometimes not possible to obtain a crew at the time the repair sleeve is installed. It is, of course, desirable to install the sleeve as soon as possible in order to prevent further loss of fluid. However, with our sleeve, welding may be postponed until a welding crew is available. The test valve provides an effective means for the welder to test the weld at the time it is made. After the weld has been tested by means of the test valve and any necessary repairs made, the test valve may be finally closed and left in closed position.

Figure 8:
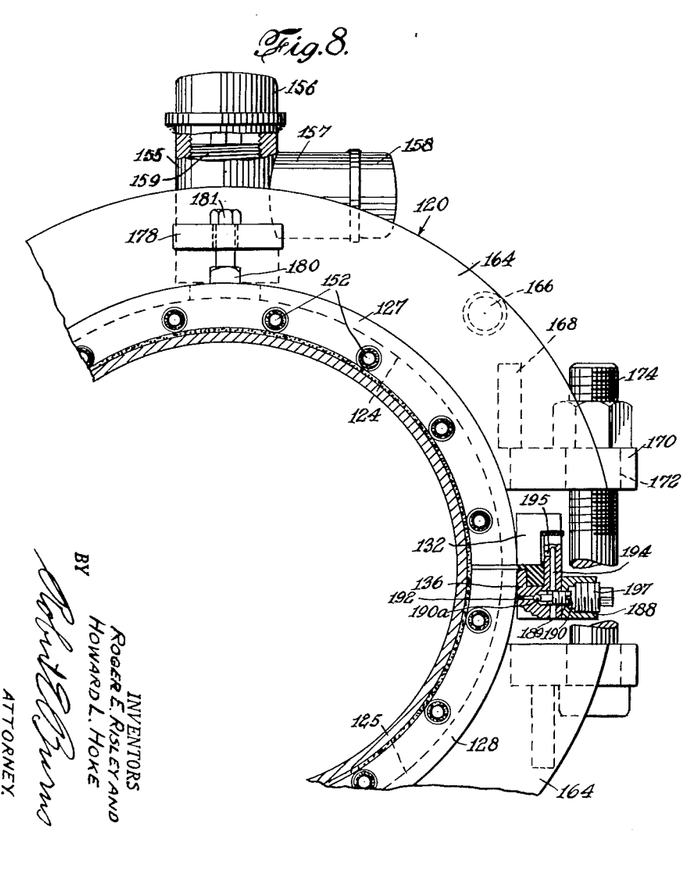
Fig. 8 is an end elevation of another embodiment of the split repair sleeve of the invention shown in position with clamp means designed for use with it during installation.
Figure 9:
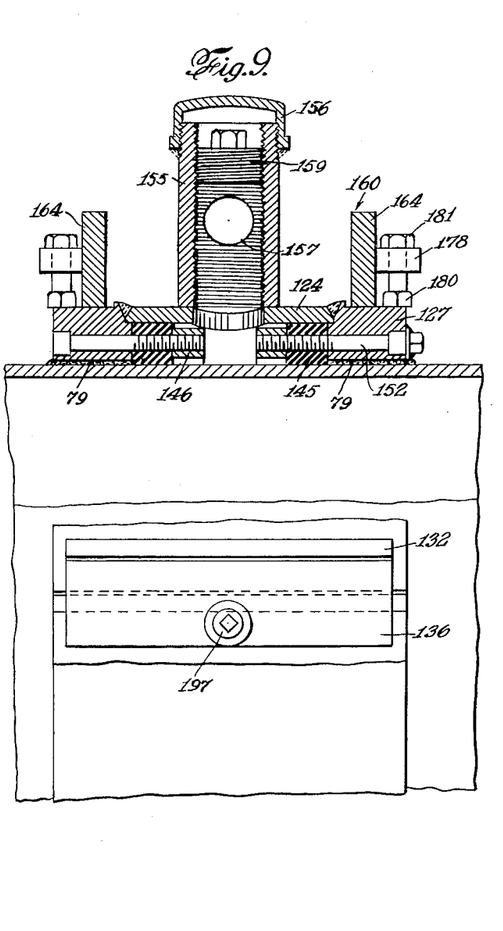
Fig. 9 is a side elevation, partly in section to show details of construction, of the split repair sleeve-clamp means construction shown in Fig. 8.

While we have thus described a preferred embodiment of our invention, it will be apparent that it is susceptible of embodiment in other forms and that various changes and modifications may be made in the embodiment above described without departing from the scope of our invention. Thus, for example, another embodiment of our welding type split repair sleeve and temporary clamp means is illustrated in Figs. 8 and 9. Referring to the drawing, wherein parts which correspond to parts in the embodiment of Figs. 1–7 are designated by like reference numerals with the addition of 100, the sleeve 120 is formed by two arcuate sleeve segments 124 and 125 having arcuate body portions and arcuate end walls 127 and 128, respectively, secured, as by welding, to the outer edges thereof. The sleeve segments 124 and 125 are provided with gaskets 145, followers 146 and bolts 152 as in the previously-described embodiment. The construction of the side bars is also similar but a somewhat modified valve element is found in the sleeve shown in Figs. 8 and 9. Thus, sleeve segment 124 has side bars 132 and sleeve segment 125 has complementary side bars 136 substantially identical in construction with the side bars 24 and 36, respectively. The valve member 190 is threadedly received in bore continuation 189 and has a substantially cylindrical inner end portion which engages a ball 190a which, when engaged by the end of the valve member 190, serves to close the bore 192. Loosening of valve member 190 permits the fluid from the interior of the sleeve to enter bore continuation 189 and flow into the space between the side bars through passageway 194, 195. The bore 188 is normally closed by a plug 197.

The clamp 160 shown in Fig. 8 and Fig. 9 comprises two arcuate sections 164 maintained in fixed spaced relationship by reinforcing bars 166 and braces 168. The ends of the sections 164 are provided with side bars 170 having aligned apertures 172 for receiving bolts 174. The strips 164 have apertured outwardly-directed extensions 178 at approximately their centers adapted to receive bolts 181 for engagement with bolt sockets 180 secured to end walls 127 and 128 for securing the clamp 160 to the sleeve. There is thus provided another split repair sleeve adapted to be easily and safely installed upon a damaged portion of a pipe line to seal off the damaged portion and to be welded in place.

As shown in the embodiment of our repair sleeve shown in Figs. 8 and 9, we advantageously provide a closable vent 155 in the sleeve segment 124 which normally is closed by a cap 156. The vent 155 has a branch 157 provided with a cap 158. The vent 155 is interiorly threaded and is provided with a plug 159. During stallation of the sleeve, plug 159 is in the upper portion of vent 155 above the branch 157. Cap 158 is removed and the contents of the line passing through the leak are vented through branch 157. Additional piping (not shown) may be attached to branch 157 to carry the vented fluid to any desired point. After installation, when it is desired to close the vent, the plug 159 is moved downwardly in vent 155 to a position below branch 157. Caps 156 and 158 are then placed upon vent 155 and branch 157, respectively, and welded in place with sealing welds. This provides a convenient and effective means for handling the escaping fluid during installation of the sleeve and reduces to a minimum interference with the operation of installing the sleeve.

It will be obvious to those skilled in the art that various other changes and modifications may be made in the embodiments illustrated without departing from the scope of the invention as defined in the appended claims, and it is intended therefore that all matter contained in the foregoing description and in the drawings shall be interpreted as illustrative and not in a limiting sense.

What we claim and desire to secure by Letters Patent is:

1. A split sleeve pipe repair device adapted to enclose a portion of a pipe line, comprising a first arcuate segment and a second complementary arcuate segment, outwardly-extending flange portions on each of said arcuate segments along each longitudinal edge thereof, each flange portion of said first segment defining an axial channel extending into the external radial face of the flange portion from the line of juncture of the flange portions of the two arcuate segments and each flange portion of said second arcuate segment including an axial web adapted to be received in the channel of a flange portion of the first arcuate segment to define an external weldable longitudinal juncture line at the edge of said web and the portion of said channel remote from said line of juncture of the segments whereby said weldable juncture line is off-set with respect to said segment juncture line, compressible sealing means at the ends of said arcuate segments, compressible sealing means disposed between the longitudinal edges of said segments extending between the first-named compressible sealing means at each end of the sleeve, and means for compressing said first-named sealing means into sealing engagement with said pipe line portion.

2. A split sleeve pipe repair device adapted to enclose a portion of a pipe line, comprising a first arcuate segment and a second complementary arcuate segment, outwardly-extending flange portions on each of said arcuate segments along each longitudinal edge thereof, each flange portion of said first segment defining an axial channel extending into the external radial face of the flange portion from the line of juncture of the flange portions of the two arcuate segments and each flange portion of said second arcuate segment including an axial web adapted to be received in the channel of a flange portion of the first arcuate segment to define an external weldable longitudinal juncture line at the edge of said web and the portion of said channel remote from said line of juncture of the segments whereby said weldable juncture line is off-set with respect to said segment juncture line, compressible sealing means at the ends of said arcuate segments, compressible sealing means disposed between the longitudinal edges of said segments extending between the first-named compressible sealing means at each end of the sleeve, and means disposed interiorly of said segments for compressing said first-named sealing means into sealing engagement with said pipe line portion.

3. A split sleeve pipe repair device adapted to enclose a portion of a pipe line, comprising a first arcuate segment and a second complementary arcuate segment, outwardly-extending flange portions on each of said arcuate segments along each longitudinal edge thereof, the flange portions of said first segment defining an axial channel and the flange portions of said second arcuate segment including an axial web adapted to be received in the channel of the first arcuate segment to define a weldable longitudinal juncture line, compressible sealing means at the ends of said arcuate segments and means for compressing said sealing means into sealing engagement with said pipe line portion, one flange portion of said second segment being formed with a passageway connecting the interior of said segment with the inner face of the web, and valve means closing said passageway.

4. A split sleeve pipe repair device adapted to enclose a portion of a pipe line, comprising a first arcuate segment and a second complementary arcuate segment, outwardly-extending weldable flange portions on each of said arcuate segments along each longitudinal edge thereof, each flange portion of said first segment defining an axial channel extending into the external radial face of the flange portion from the line of juncture of the flange portions of the two arcuate segments and each flange portion of said second arcuate segment including an axial web adapted to be received in the channel of a flange portion of the first arcuate segment to define an external weldable longitudinal juncture line at the edge of said web and the portion of said channel remote from said line of juncture of the segments whereby said weldable juncture line is off-set with respect to said segment juncture line, compressible sealing means disposed between the longitudinal edges of said segments, removable clamp means for pressing said segments together to compress said sealing means, and means removably securing said clamp means to said arcuate segments.

5. A split sleeve pipe repair device adapted to enclose a portion of a pipe line, comprising a first arcuate segment and a second complementary arcuate segment, outwardly-extending weldable flange portions on each of said arcuate segments along each longitudinal edge thereof, compressible sealing means disposed between the longitudinal edges of said segments, removable clamp means for pressing said segments together to compress said sealing means, said clamp means including two separable members formed from interconnected axially spaced-apart arcuate webs, bolt means for drawing said members together and means removably securing one of said members to each of said sleeve segments.

6. A split sleeve pipe repair device adapted to enclose a portion of a pipe line, comprising a first arcuate segment and a second complementary arcuate segment, outwardly-extending flange portions on each of said arcuate segments along each longitudinal edge thereof, each flange portion of said first segment defining an axial channel extending into the external radial face of the flange portion from the line of juncture of the flange portions of the two arcuate segments and each flange portion of said second arcuate segment including an axial web adapted to be received in the channel of a flange portion of the first arcuate segment to define an external weldable longitudinal juncture line at the edge of said web and the portion of said channel remote from said line of juncture of the segments whereby said weldable juncture line is off-set with respect to said segment juncture line, compressible sealing means disposed between the longitudinal edges of said segments, removable clamp means for pressing said segments together to compress said sealing means, and means removably securing said clamp means to said arcuate segments.

7. A split sleeve pipe repair device adapted to enclose a portion of a pipe line, comprising a first arcuate segment and a second complementary arcuate segment, outwardly-extending flange portions on each of said arcuate segments along each longitudinal edge thereof, the flange portions of said first segment defining an axial channel and the flange portions of said second arcuate segment including an axial web adapted to be received in the channel of the first arcuate segment to define a weldable longitudinal juncture line, compressible sealing means disposed between the longitudinal edges of said segments, removable clamp means for pressing said segments together to compress said sealing means, said clamp means including two separable members formed from interconnected axially spaced-apart arcuate webs, bolt means for drawing said members together and means removably securing one of said members to each of said sleeve segments.

8. A split sleeve pipe repair device adapted to enclose a portion of a pipe line comprising a first arcuate segment and a second complementary arcuate segment, outwardly-extending flange portions on each of said arcuate segments along each longitudinal edge thereof, the flange portions of said first segment including an axial body portion and an outwardly-extending radial web, the flange portions of said second segment comprising a radial body portion and an axial web integral with the outer edge thereof and adapted to overlie the body portion of the adjacent first segment flange body portion to define an external weldable longitudinal juncture line remote from the meeting edges of the segments, compressible sealing means at the ends of said arcuate segments, means for compressing said sealing means into sealing engagement with said pipe line portion, and compressible sealing means disposed between the first-named compressible sealing means at each end of the sleeve.

9. A split sleeve pipe repair device adapted to enclose a portion of a pipe line comprising a first arcuate segment and a second complementary arcuate segment, outwardly-extending flange portions on each of said arcuate segments along each longitudinal edge thereof, the flange portions of said first segment including an axial body portion and an outwardly-extending radial web, the flange portions of said second segment comprising a radial body portion and an axial web integral with the outer edge thereof and adapted to overlie the body portion of the adjacent first segment flange body portion to define an external weldable longitudinal juncture line remote from the meeting edges of the segments, compressible sealing means at the ends of said arcuate segments, means for compressing said sealing means into sealing engagement with said pipe line portion, compressible sealing means disposed between the first-named compressible sealing means at each end of the sleeve, and removable clamp means for pressing said segments together to compress said longitudinal sealing means, and means removably securing said clamp means to said arcuate segments.

10. A split sleeve pipe repair device adapted to enclose a portion of a pipe line comprising a first arcuate segment and a second complementary arcuate segment, outwardly-extending flange portions on each of said arcuate segments along each longitudinal edge thereof, the flange portions of said first segment including an axial body portion and an outwardly-extending radial web, the flange portions of said second segment comprising a radial body portion and an axial web integral with the outer edge thereof and adapted to overlie the body portion of the adjacent first segment flange body portion to define an external weldable longitudinal juncture line remote from the meeting edges of the segments, compressible sealing means at the ends of said arcuate segments, means for compressing said sealing means into sealing engagement with said pipe line portion, compressible sealing means disposed between the first-named compressible sealing means at each end of the sleeve, removable clamp means for pressing said segments together to compress said longitudinal sealing means, said clamp means including two separable members, bolt means for drawing said members together, and means removably securing one of said members to each of said sleeve segments.

11. A split sleeve pipe repair device adapted to enclose a portion of a pipe line comprising a first arcuate segment and a second complementray arcuate segment, outwardly-extending flange portions on each of said arcuate segments along each longitudinal edge thereof, the flange portions of said first segment including an axial body portion and an outwardly-extending radial web, the flange portions of said second segment comprising a radial body portion and an axial web integral with the outer edge thereof and adapted to overlie the body portion of the ajacent first segment flange body portion to define a weldable longitudinal juncture line remote from the meeting edges of the segments, a passageway in one of the flange portions of said second segment extending through said radial body portion and said axial web and communicating with the interior of said second segment and the inner face of said axial web, and valve means for closing said passageway.

12. A split sleeve pipe repair device adapted to enclose a portion of a pipe line, comprising a first arcuate segment and a second complementary arcuate segment, outwardly-extending flange portions on each of said arcuate segments along each longitudinal edge thereof, the flange portions of said first segment defining an axial channel and the flange portions of said second arcuate segment including an axial web adapted to be received in the channel of the first arcuate segment to define a weldable longitudinal juncture line, compressible sealing means at the ends of said arcuate segments, means for compressing said sealing means into sealing engagement with said pipe line portion and closable vent means in one of said segments, said vent means comprising an internally threaded tubular member, a branch outlet communicating with the side of said tubular member and a plug threadedly engageable in said tubular member and movable across said branch outlet.

References Cited in the file of this patent

UNITED STATES PATENTS

| Number | Name | Date |
| --- | --- | --- |
| 732,400 | Dresser et al. | June 30, 1903 |
| 2,188,302 | Pffefferle | Jan. 30, 1940 |
| 2,224,918 | Merrill | Dec. 17, 1940 |
| 2,286,751 | Merrill | June 16, 1942 |
| 2,492,507 | Tipton | Dec. 27, 1949 |